Oct. 11, 1960

R. C. DAVIS 2,955,325

METHOD AND APPARATUS FOR MANUFACTURING
RUBBERIZED FABRIC ARTICLES

Filed Dec. 11, 1956

INVENTOR.
RALPH C. DAVIS

BY *W. A. Fraser*

ATTY.

Oct. 11, 1960 R. C. DAVIS 2,955,325
METHOD AND APPARATUS FOR MANUFACTURING
RUBBERIZED FABRIC ARTICLES
Filed Dec. 11, 1956 2 Sheets-Sheet 2

INVENTOR.
RALPH C. DAVIS
BY W. A. Fraser
ATTY.

United States Patent Office 2,955,325
Patented Oct. 11, 1960

2,955,325

METHOD AND APPARATUS FOR MANUFACTURING RUBBERIZED FABRIC ARTICLES

Ralph Charles Davis, Akron, Ohio, assignor to The Firestone Tire & Rubber Company, Akron, Ohio, a corporation of Ohio Filed Dec. 11, 1956, Ser. No. 627,586

7 Claims. (Cl. 18—53)

The present invention relates generally to method and apparatus for use in the manufacture of rubberized fabric articles. More particularly, the invention relates to method and apparatus for the shaping and curing of rubberized fabric articles. Specifically, the invention relates to the shaping and curing, or vulcanization, of single convolution air spring bellows suitable for use in the suspension system of a vehicle.

In the course of manufacturing single convolution air spring bellows having opposed beads of materially different diameters, the first stage of manufacture involves the preparation or assembly on a suitable mandrel of a tube having multiple plies of rubberized fabric with cords which preferably extend at an angle of about 5–25° to the axis of the bellows, the cords of one ply crossing the cords of the other. The interior of the bellows has a soft lining of rubber, preferably neoprene because of its oil resistant properties, to retain air within the bellows. The ends of the plies are wrapped about and anchored to circular beads of materially different diameters so that in the cured bellows, one bead can pass through the other during the working stroke of the bellows.

In the second stage of manufacturing air spring bellows, a fluid impermeable reinforcing member is preferably incorporated within the uncured bellows preparation as an integral part thereof. These members strengthen critical points of wear or applying loads and also, if seated at one end of an air spring bellows in a fluid tight manner, provide a closure for one end of the bellows so as to facilitate the final shaping and curing of the bellows.

In the final stage of manufacture, the uncured bellows preparation with a reinforcing member or closure in place at one end thereof is placed in an apparatus carrying a plurality of axially separable mold sections each having a molding surface conforming to a portion of the finished shape of a cured air spring bellows.

The separable mold sections, preferably three in number and designated as "upper," "middle" and "lower," are closed together with an uncured bellows therein. Concurrently with initiation of the closing movement of the mold sections, a shaping fluid such as air under pressure is introduced into the interior of the uncured bellows preparation from the bottom mold section so as to cause the bellows structure to distend and assume the same configuration as the molding surfaces. The distention of the preparation breaks the pick cords and causes the angle of the rubberized fabric cords to change. If this change in the cord angle occurs too rapidly the outermost surfaces of the uncured bellows will be pinched or unevenly stressed and distorted. In the event that the rubber and fabric cords are cured in the pinched condition, by the introduction of steam or other suitable vulcanizing media into the interior of the bellows, the bellows will be defective, exhibiting the phenomenon described as "blistering."

It has been found that blistering and other defects attributable to faulty shaping and curing of a single convolution air spring bellows can be avoided if the shaping fluid is applied in a predetermined sequence or cycle involving the precise use of a pulsating pressure, sufficient to progressively distend the preparation into contact with the forming surfaces of the mold, rather than a substantially unvaried pressure such as has been heretofore known in the art. Immediately following shaping, the curing fluid is also applied in a precise manner so as to further prevent the occurrence of blistering and other defects.

Therefore, it is an object of the invention to provide improvements in method and apparatus for use in the manufacture of single convolution air spring bellows.

Further, it is an object of the invention to provide improvements in method and apparatus for the shaping and curing of air spring bellows.

Still further, it is an object to provide improvements in method and apparatus for the application of pulsating shaping pressures of predetermined magnitude, to distend an uncured bellows preparation within the forming surfaces of a mold, followed by the precise application of elevated temperatures and pressures, to cure the bellows preparation in the distended condition.

These and other objects of the invention will be apparent in view of the following detailed description of the invention taken in conjunction with the attached drawings.

Figure 2:
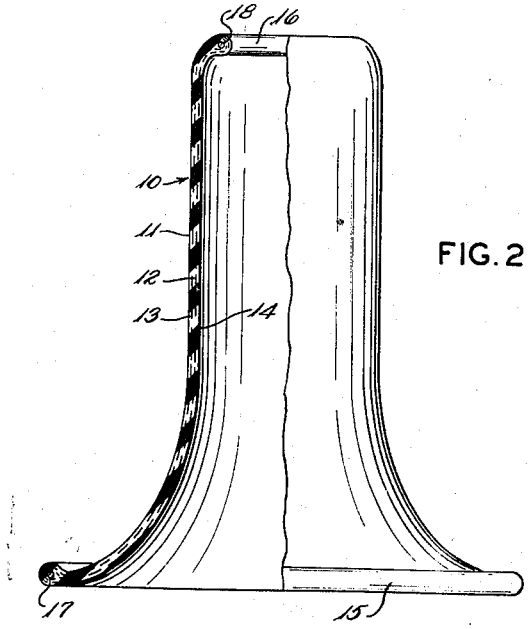
Fig. 2 is a sectional view of an uncured air spring bellows preparation prior to shaping and curing.

The invention includes the application of varied shaping and curing pressures for predetermined periods of time so as to form an uncured air spring bellows preparation indicated generally by the numeral 10 into the finished form air spring bellows indicated generally by the numeral 10A. Referring to Fig. 2, the body 11 of a bellows 10 is preferably of two plies 12 and 13 of rubberized fabric and has a rubber lining 14. The fabric cords of the plies cross each other and are at angles of about 5°–25° to the longitudinal axis of the body 11. The ends of the plies are wrapped about and anchored to a pair of circular beads 15 and 16 which are reinforced by cores 17 and 18, respectively, of steel wire.

Figure 3:
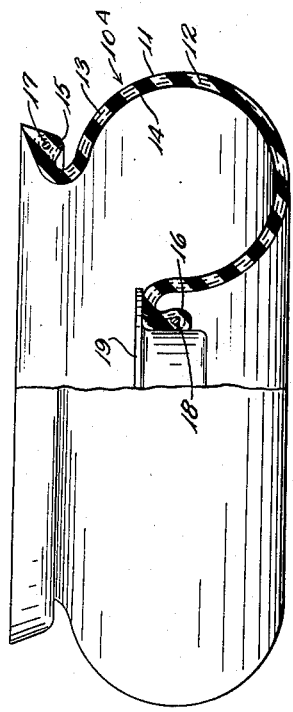
Fig. 3 is a sectional view of a finished air spring bellows.

Referring to Fig. 3, the larger bead 15 of one form of a finished bellows 10A is adapted to be fixed securely to the frame of a vehicle (not shown). The smaller or bottom bead 16, reinforced by a rigid, fluid impermeable closure disk 19 contacts the vehicle road gear.

Figure 1:
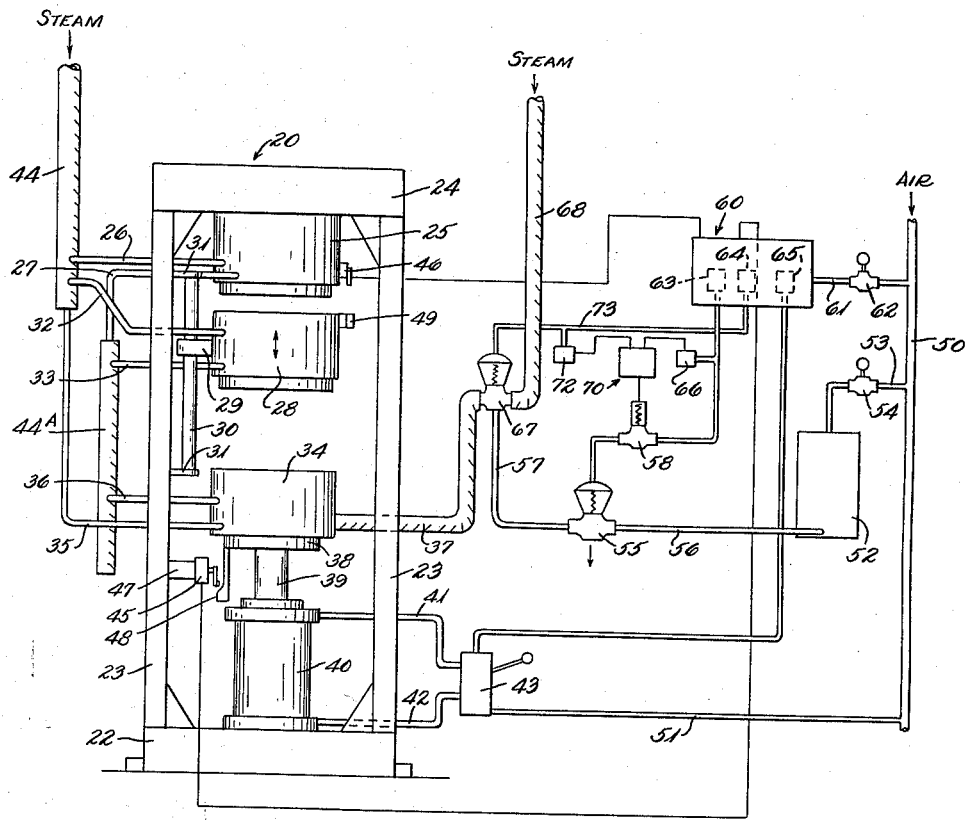
Fig. 1 is a view of a molding apparatus or "press" with the controls, piping and electrical wiring therefor being shown schematically.

Referring to Fig. 1, a suitable press for the shaping and curing of air spring bellows is indicated generally by the numeral 20. The press includes a base 22 and structural frame members 23 connected at the top by a rigid cross member 24. Depending from the cross member 24 is an upper or top mold section 25 having an interior molding surface (not shown) which preferably forms the smaller diameter end portion (bead 16) during the shaping and curing of a finished bellows 10A. The mold section 25 is jacketed in a conventional manner so that steam or other suitable heating media may be continually introduced for heating the molding surface. The steam supply and return lines are indicated at 26 and 27, respectively.

The middle mold section is indicated at 28 and has an interior molding surface (also, not shown) which forms the middle or convoluted portion during the shaping and curing of a finished bellows. The mold section 28 is provided with a side bracket 29 which is mounted around a vertical rod 30 supported at either end by brackets 31 attached to the frame 23. The bracket 29 is so mounted on the rod 30 that the mold section 28 is pivotable in a horizontal plane beneath the upper mold section for purposes of loading an uncured bellows 10 and unloading a finished bellows 10A. The mold section is also vertically slidable on the rod 30 so that the mold sections may be closed together in the manner described below. The mold section 28 is also jacketed in a conventional manner with flexible steam supply and return lines being indicated at 32 and 33, respectively.

The lower or bottom mold section is indicated at 34 and has an interior molding surface (also, not shown) which preferably forms the larger diameter end portion (bead 15) during the shaping and curing of a finished bellows 10A. The mold section 34 is also jacketed in a conventional manner with flexible steam supply lines being indicated at 35 and 36, respectively. An insulated flexible line 37, referred to below, communicates with the interior of the mold section through conventional interior passages (not shown). The lower mold section is mounted, in axial alignment with the upper mold section 25, on a plate 38 attached to the end of a piston rod 39 of a suitable fluid pressure operated cylinder 40. The cylinder 40 is mounted on the base 22 and is connected by supply and return lines, 41 and 42, respectively, to a control valve 43.

In the case of each mold section, the steam jacket supply lines 26, 32 and 35, are connected to a steam header 44 supplying steam under elevated curing temperatures and pressures, for example 300° F. and 50 p.s.i. The exhaust lines 27, 33 and 36 are connected to an exhaust manifold 44A.

The closing movements of the mold sections 25, 28 and 34 are signalled by conventional electrical limit switches 45 and 46 which control the application of the shaping and curing media. The normally open limit switch 45 is mounted on a bracket 47 attached to a frame member 23. Switch 45 is closed by an actuating member 48 attached to the plate 38 when the piston rod 39 is extended to initiate closing together of the mold sections. The normally open limit switch 46 is mounted on the upper mold section 25 so as to be closed by a cam member 49 on the middle mold section 28 when the mold sections are fully closed.

The fluid pressure for operation of the apparatus 20 may be supplied from a high pressure (for example 80 p.s.i.) air line 50. Pressure for actuation of the piston 40 is supplied to the control valve 43 through suitable piping 51. If the shaping media is to be air, an air reservoir tank 52 is provided. The air in tank 52 is under a pressure of preferably 15 p.s.i. and is supplied from the line 50 through a line 53 fitted with a suitable reducing valve 54. The tank 52 is connected to a diaphragm operated three-way valve 55 by a line 56. The valve 55 connects with the mold line 37 through a line 57 running to a three-way stream supply valve 67, described below. The valve 55 is also vented to the atmosphere. Movement of the valve 55 is controlled by a coupled solenoid valve 58.

The application of the shaping and curing fluids is preferably controlled by a conventional pneumatic timer or time control device indicated generally at 60. The initiation of the shaping and curing cycle, when the cylinder 40 is actuated by the control valve 43, is electrically signalled to the timer 60 by the concurrent closing of the limit switch 45. The complete closing of the three mold sections is electrically signalled to the timer 60 by closing of the limit switch 46. In a preferred form of the invention, the timer 60 for its control functions utilizes air under reduced pressure from line 50 supplied through a line 61 fitted with a suitable reducing valve 62.

The timer 60 employs three control components, schematically shown in dotted lines and indicated at 63, 64 and 65, which are actuated in timed sequence. Control 63 is a valve which when open passes air to the solenoid valve 58 so that pressure is available for opening the diaphragm valve 55. Opening of control 63 also closes a normally open pressure switch 66. Control 64 is a valve which when opened will pass air at a pressure sufficient to open a second diaphragm operated three-way valve 67, connecting a steam supply line 68 and the air line 57 with the mold supply line 37. The third control 65 of the timer is a valve which when opened will pass air at a pressure sufficient to reverse the control valve 43 and open the mold sections.

Closing of the pressure switch 66 by opening of the timer control component 63 starts the timing cycle of a second timer indicated generally at 70. The timer 70 is preferably of the rotary, knock out pin type, and is adjusted to alternately energize and de-energize the solenoid valve 58 for transmitting a pulsating pressure to the mold supply line 37. A second pressure switch 72, which is normally closed, is connected into the line 73 between the timer control component 64 and the valve 67. When the valve 67 is opened, admitting the curing fluid into the mold supply line 37, the pressure switch 72 will stop (and reset) the timer 70, de-energizing solenoid valve 58, so that the pulsating flow of the shaping fluid through valve 55 ceases entirely.

Figure 4:
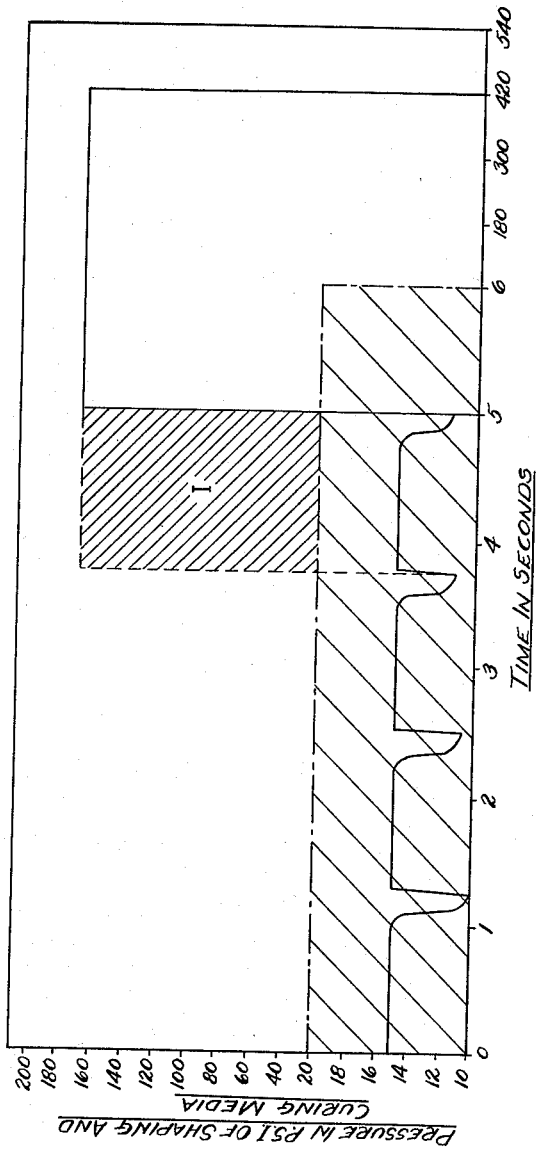
Fig. 4 is a chart or graph of a shaping and curing pressure/time cycle, with pressure being the ordinate and time the abscissa.

The operation of the apparatus 20 to shape and cure a finished bellows 10 requires the use of shaping and curing pressures of a predeterminate magnitude, as shown in Fig. 4. Fig. 4 is a chart, indicating the variation in pressure in the mold supply line 37, on which the abscissa represents time in seconds and the ordinate represents pressure in p.s.i. The rectangular area in the lower left corner of Fig. 4, as delineated by the chain line and the widely spaced cross hatching, includes the time from 0 to 6 seconds and 10 to 20 p.s.i. The remaining area of Fig. 4 is on a smaller scale and includes time from 60 to 540 seconds (1 to 9 minutes) and pressure from 20 to 200 p.s.i.

In the practice of the invention, a shaping fluid such as air, is applied to the interior of a secured bellows structure 10 for a period not to exceed 5 seconds. As shown in Fig. 4, the flow of the shaping fluid under pressure is pulsating or intermittent. That is, for a period of one second the pressure of the shaping fluid is 15 p.s.i. Then, the fluid pressure is cut off for a period of one-quarter second and the interior of the bellows is vented to atmosphere. The 15 p.s.i. pressure is then reapplied at least twice more, followed each time by a one-quarter second interval during which the flow of the shaping fluid is cut off and the bellows is vented. Thus, the minimum period for application of the shaping pressure is three one second intervals at 15 p.s.i., followed by three one-quarter second intervals of no applied pressure and bellows venting, a total of three and three-quarter seconds. Following the period for application of the shaping pressure, the curing media (steam at 370° F. and 170 p.s.i.) is introduced into the interior of the bellows structure for a period of from six to eight minutes.

In Fig. 4, the dotted line represents the application of pulsating pressure for the minimum period of three and three-quarter seconds. The solid line represents the application of pulsating pressure for the maximum period of five seconds. The cross hatched area indicated by the symbol I, depicts that period of time during which either the shaping or curing media may be applied.

The first step in forming a bellows 10A is securing or clamping the larger diameter end (bead 16) of an uncured tubular structure 10 to a lower mold section 35. The control valve 43 is concurrently actuated so as to cause the piston 39 to be extended from the cylinder 40 and initiate closing together of the three mold sections.

As the lower mold section rises toward the middle mold section 28, the actuating member 48 closes limit switch 45 signalling the timer 60. The timer 60 immediately actuates its control component 63 which opens, closing pressure switch 66, and starting the rotary timer 70. The timer 70 is so adjusted as to initially energize the solenoid valve 58 for one second. Energization of the solenoid 58 opens the coupled valve 55 and the flow of 15 p.s.i. air commences. After one second, the timer 70 de-energizes the solenoid valve 58 for one-quarter second, operating valve 55 so as to cut off the flow of air from line 56 and vent the air within the bellows through line 37, valve 67 and line 57 to the atmosphere. The timer 70 is set to continue the alternate energization and de-energization of the solenoid 58, providing a pulsating shaping pressure, until the pressure switch 72 is opened and stops the timer 70, shutting off the flow through valve 55 of air from line 56.

The duration of the period of application of the shaping pressure is controlled by the second limit switch 46 which is closed when the middle mold section 28 contacts the upper mold section 25. When switch 46 is closed, signalling the timer 60, the control component 64 is actuated so as to open the pressure switch 72, and operate valve 67 so as to permit the supply of steam from line 68 to commence and block line 57.

The timer 60 permits the control componnet 64 to remain open for the desired curing period. During this time, the component 63 is closed and the pressure switch 66 is opened, the timer 70 having been reset by opening of the pressure switch 72. At the end of the curing period, the timer component 65 is opened so as to reverse the control valve 43 opening the mold sections.

The use of air as the shaping media represents the preferred form of the invention. The use of air is preferred because of the availability in a plant of a supply of compressed air. However, other fluids including water or steam could also be used as the shaping media.

The application of a pulsating 15 p.s.i. pressure for 3¾ to 5 seconds is suitable for the shaping of a finished bellows (Fig. 3) in which the bottom bead 16 has an external diameter of about 2¾", the top bead 15 has an external diameter of about 5¾", and the convoluted portion has a diameter of about 8" to 11" at its widest point. The purpose of the use of a pulsating pressure is to first apply, for a predetermined short period of time, a pressure sufficient to distend the structure 10 so that the angular relation of the crossed cords in the fabric plies is changed. This is followed by shutting off the applied pressure and venting the bellows for a shorter period of time so that the cords tend to be stabilized in their distended angular relation. The alternation of applying and shutting off pressure and venting is continued until all of the cords progressively have assumed their new angular relation, breaking the pick cords if necessary, and have become stabilized without pinching or distorting the outer surface of the bellows. Thus, in the event that the invention is employed for manufacturing air spring bellows having a similar form but with different dimensions, it may be necessary to employ a shaping pressure somewhat other than 15 p.s.i. for somewhat different periods of time.

With reference to the use of steam as the curing media at a temperature of 370° F. and a pressure of 170 p.s.i., it will be apparent that this is the preferred form. Other media, temperatures and pressures which will retain the bellows structure 10 in the distended form after the shaping fluid is cut off, and will cause the structure to become fully vulcanized, may be employed.

The bellows structure 10 as shown in Fig. 3 incorporates therein a closure disk 19 seated interiorly of the structure adjacent the smaller bead 16. The closure 19 permits the shaping media to be applied whenever the structure 10 is clamped to the bottom mold section 34, without the necessity of the structure having been contacted by the upper mold section 25. In the event that the closure 19 is not a part of the structure 10, the principles of the invention are applicable if the shaping pressure is not applied until the structure contacts the upper mold section in an air tight manner.

While a preferred embodiment of the invention has been shown and described, it will be apparent to those skilled in this art that individual componnets of applicant's apparatus could be changed or modified without departing from the spirit of the invention. For example, the mold sections could be reversed in order, with the large bead of the bellows being formed in the upper mold section. The control timer 60 and the rotary timer 70 could, if desired, be incorporated into one unit, dispensing with the need for the pressure switches 65 and 72 as separate elements. Accordingly, these and other modifications which are apparent in view of the disclosure herein, are to be deemed within the scope of the subjoined claims.

What is claimed is:

1. A method of shaping and curing an air spring bellows from a preparation having a tubular body portion with rubberized fabric cords in a predetermined angular relation, comprising the steps of, positioning said preparation within a mold, introducing a fluid into the interior of said preparation under pulsating pressure to distend said body within the forming surfaces of said mold and substantially alter the angular relation of said cords, and then subjecting said body to increased pressure at an elevated temperature to cure said body in the distended condition.

2. A method of shaping and curing an air spring bellows from a preparation having a tubular body portion with rubberized fabric cords in a predetermined angular relation, comprising the steps of, positioning said preparation within a mold, introducing a fluid into the interior of said preparation under pulsating pressure to progressively distend said body into contact with the forming surfaces of said mold and substantially alter the angular relation of said cords, and then subjecting said body to increased pressure at an elevated temperature to cure said body in the distended condition.

3. A method of shaping and curing an air spring bellows from a tubular structure having bead rings connected by multiple plies of rubberized fabric with their cords in crossed relation, comprising the steps of positioning said structure within a mold and clamping one end and sealing the other end of said structure, introducing fluid into the interior of said clamped and sealed structure under pulsating pressure of brief duration to distend said structure within the forming surfaces of said mold and change the angular relation of said cords, and then introducing fluid into the interior of said distended structure at an elevated temperature and pressure to cure said structure in the distended condition.

4. A method of shaping and curing an air spring bellows from a tubular structure having bead rings connected by multiple plies of rubberized fabric with their cords in crossed relation, comprising the steps of, positioning said structure within a mold and clamping one end and sealing the other end of said structure, introducing air into the interior of said clamped and sealed structure under pulsating pressure of brief duration to progressively distend said structure into contact with the forming surfaces of said mold and change the angular relation of said cords, and then introducing steam into the interior of said distended structure at an elevated temperature and pressure to cure said structure in the distended condition.

5. A method of shaping and curing an air spring preparation having bead rings of different diameters connected by multiple plies of rubberized fabric with their cords in crossed relation, comprising the steps of, positioning said preparation within a mold and clamping the larger diameter end and sealing the smaller diameter end of said preparation, introducing fluid into the interior of said clamped and sealed preparation under pulsating pressure sufficient to progressively distend said preparation into contact with the forming surfaces of said mold to change the angular relation of said cords without uneven distortion of the outer surface of said preparation, and then introducing fluid into the interior of said distended preparation at an elevated temperature and pressure to cure said preparation in the distended condition.

6. A method of shaping and curing an air spring preparation having bead rings of different diameters connected by multiple plies of rubberized fabric with their cords in crossed relation, comprising the steps of, positioning said preparation within a mold and clamping the larger diameter end and sealing the smaller diameter end of said preparation, introducing air into the interior of said clamped and sealed preparation under pulsating pressure sufficient to progressively distend said preparation into contact with the forming surfaces of said mold to change the angular relation of said cords without uneven distortion of the outer surface of said preparation, and then introducing steam into the interior of said distended preparation at an elevated temperature and pressure to cure said preparation in the distended condition.

7. A method of shaping and curing an air spring bellows from a preparation having bead rings of different diameters connected by multiple plies of rubberized fabric with their cords in crossed relation, comprising the steps of, positioning said preparation within a mold and clamping one end and sealing the other end of said preparation, introducing air into the interior of said clamped and sealed preparation under a pulsating 15 p.s.i. maximum pressure for a period of from 3¾ to 5 seconds so as to progressively distend said preparation into contact with the forming surfaces of said mold to change the angular relation of said cords without uneven distortion of the outer surface of said preparation, and then introducing steam into the interior of said distended preparation at an elevated temperature and pressure to cure said preparation in the distended condition.

References Cited in the file of this patent

UNITED STATES PATENTS

| | | |
|---|---|---|
| 1,958,422 | Dinzl | May 15, 1934 |
| 2,027,165 | Grubman | Jan. 7, 1936 |
| 2,221,470 | Brown | Nov. 12, 1940 |
| 2,243,532 | Maynard | May 27, 1941 |
| 2,354,446 | Brown | July 25, 1944 |
| 2,367,242 | Stacy | Jan. 16, 1945 |